(12) United States Patent
Hariri et al.

(10) Patent No.: US 9,836,765 B2
(45) Date of Patent: Dec. 5, 2017

(54) SYSTEM AND METHOD FOR CONTEXT-AWARE RECOMMENDATION THROUGH USER ACTIVITY CHANGE DETECTION

(71) Applicant: Kibo Software, Inc., Dallas, TX (US)

(72) Inventors: Negar Hariri, Chicago, IL (US); HawWuen Chan, San Jose, CA (US)

(73) Assignee: Kibo Software, Inc., Dallas, TX (US)

( * ) Notice: Subject to any disclaimer, the term of this patent is extended or adjusted under 35 U.S.C. 154(b) by 237 days.

(21) Appl. No.: 14/281,608

(22) Filed: May 19, 2014

(65) Prior Publication Data

US 2015/0332372 A1    Nov. 19, 2015

(51) Int. Cl.
*G06F 3/048* (2013.01)
*G06Q 30/02* (2012.01)
*G06Q 30/06* (2012.01)
*G06F 17/30* (2006.01)

(52) U.S. Cl.
CPC ......... *G06Q 30/0269* (2013.01); *G06F 3/048* (2013.01); *G06F 17/3097* (2013.01); *G06F 17/30867* (2013.01); *G06Q 30/0631* (2013.01)

(58) Field of Classification Search
CPC ....................................................... G06F 3/048
See application file for complete search history.

(56) References Cited

U.S. PATENT DOCUMENTS

| 5,794,178 | A | 8/1998 | Caid et al. |
|---|---|---|---|
| 5,867,799 | A | 2/1999 | Lang et al. |
| 5,890,149 | A | 3/1999 | Schmonsees |
| 5,924,105 | A | 7/1999 | Punch, III et al. |
| 5,983,214 | A | 11/1999 | Lang et al. |

(Continued)

FOREIGN PATENT DOCUMENTS

| WO | WO01-33410 | 5/2001 |
|---|---|---|
| WO | WO 01/93076 | 12/2001 |

(Continued)

OTHER PUBLICATIONS

Almeida, R.B. et al.; A Community-Aware Search Engine; ACM, May 2004 pp. 413-421. Department of Computer Science, Universidade Federal de Minas Gerais, Belo Horizonte, MG, Brazil; 2004.

(Continued)

*Primary Examiner* — Xuyang Xia
(74) *Attorney, Agent, or Firm* — Knobbe, Martens, Olson & Bear, LLP (57) ABSTRACT

Example systems and methods for context-aware recommendation generation are described. In one implementation, item models are built using user preference data of multiple users and item information of multiple items. When a recommendation request corresponding to a user is received, the profile of that user is retrieved from the user profile database. Given the profile of the user and the item models, utility scores are then computed for the candidate items. Our system exploits a novel approach to detect any sudden and significant changes in the preference data of the given user. If a change is detected, the utility scores are adapted to prioritize the user's most recent preferences. The computed utility scores are used as the basis for ranking the items. A subset of items with highest scores is then selected as recommendations and is presented to the user.

9 Claims, 5 Drawing Sheets

(56) References Cited

U.S. PATENT DOCUMENTS

| | | |
|---|---|---|
| 6,016,475 A | 1/2000 | Miller et al. |
| 6,041,311 A | 3/2000 | Chislenko et al. |
| 6,049,777 A | 4/2000 | Sheena et al. |
| 6,070,133 A | 5/2000 | Brewster et al. |
| 6,112,186 A | 8/2000 | Bergh et al. |
| 6,202,058 B1 | 3/2001 | Rose et al. |
| 6,240,407 B1 | 5/2001 | Chang et al. |
| 6,327,590 B1 | 12/2001 | Chidlovskii et al. |
| 6,334,124 B1 | 12/2001 | Bouchard et al. |
| 6,418,448 B1 | 7/2002 | Sarkar |
| 6,438,579 B1 | 8/2002 | Hosken |
| 6,493,703 B1 | 12/2002 | Knight et al. |
| 6,502,091 B1 | 12/2002 | Chundi et al. |
| 6,687,696 B2 | 2/2004 | Hofmann et al. |
| 6,839,680 B1 | 1/2005 | Liu et al. |
| 6,842,877 B2 | 1/2005 | Robarts et al. |
| 6,853,998 B2 | 2/2005 | Biebesheimer et al. |
| 6,931,391 B2 | 8/2005 | Tang et al. |
| 6,938,035 B2 | 8/2005 | Driesch et al. |
| 6,943,877 B2 | 9/2005 | Diehr et al. |
| 6,970,884 B2 | 11/2005 | Aggarwal |
| 7,031,961 B2 | 4/2006 | Pitkow et al. |
| 7,051,017 B2 | 5/2006 | Marchisio |
| 7,092,936 B1 | 8/2006 | Alonso et al. |
| 7,093,012 B2 | 8/2006 | Olstad et al. |
| 7,162,473 B2 | 1/2007 | Dumais et al. |
| 7,203,909 B1 | 4/2007 | Horvitz et al. |
| 7,295,995 B1 | 11/2007 | York et al. |
| 7,343,365 B2 | 3/2008 | Farnham et al. |
| 7,349,827 B1 | 3/2008 | Heller et al. |
| 7,389,201 B2 | 6/2008 | Chickering et al. |
| 7,401,087 B2 | 7/2008 | Copperman et al. |
| 7,424,488 B2 | 9/2008 | Aggarwal et al. |
| 7,546,295 B2 | 6/2009 | Brave et al. |
| 7,580,930 B2 | 8/2009 | Brave et al. |
| 7,693,836 B2 | 4/2010 | Brave et al. |
| 7,698,270 B2 | 4/2010 | Brave et al. |
| 7,702,690 B2 | 4/2010 | Brave et al. |
| 7,856,441 B1 | 12/2010 | Kraft et al. |
| 7,856,446 B2 | 12/2010 | Brave et al. |
| 8,095,523 B2 | 1/2012 | Brave et al. |
| 8,370,362 B2 | 2/2013 | Szabo |
| 8,601,023 B2 | 12/2013 | Brave et al. |
| 2001/0018698 A1 | 8/2001 | Uchino et al. |
| 2001/0049671 A1 | 12/2001 | Joerg |
| 2002/0016786 A1 | 2/2002 | Pitkow et al. |
| 2002/0029208 A1 | 3/2002 | Josephson |
| 2002/0075320 A1 | 6/2002 | Kurapati |
| 2002/0078091 A1 | 6/2002 | Vu et al. |
| 2002/0082901 A1 | 6/2002 | Dunning et al. |
| 2002/0103698 A1 | 8/2002 | Cantrell |
| 2002/0103789 A1 | 8/2002 | Turnbull et al. |
| 2002/0107853 A1 | 8/2002 | Hofmann et al. |
| 2002/0116421 A1 | 8/2002 | Fox et al. |
| 2002/0147895 A1 | 10/2002 | Glance et al. |
| 2002/0149614 A1 | 10/2002 | Biebesheimer et al. |
| 2002/0188589 A1 | 12/2002 | Salmenkaita et al. |
| 2002/0199009 A1 | 12/2002 | Willner et al. |
| 2003/0004996 A1 | 1/2003 | Novaes |
| 2003/0005053 A1 | 1/2003 | Novaes |
| 2003/0043815 A1 | 3/2003 | Tinsley et al. |
| 2003/0101451 A1 | 5/2003 | Bentolila et al. |
| 2003/0158855 A1 | 8/2003 | Farnham et al. |
| 2003/0172075 A1 | 9/2003 | Reisman |
| 2004/0031058 A1 | 2/2004 | Reisman |
| 2004/0039630 A1 | 2/2004 | Begole et al. |
| 2004/0059626 A1 | 3/2004 | Smallwood |
| 2004/0088276 A1 | 5/2004 | Elder et al. |
| 2004/0088312 A1 | 5/2004 | Elder et al. |
| 2004/0088315 A1 | 5/2004 | Elder et al. |
| 2004/0088322 A1 | 5/2004 | Elder et al. |
| 2004/0088323 A1 | 5/2004 | Elder et al. |
| 2004/0088325 A1 | 5/2004 | Elder et al. |
| 2004/0117222 A1 | 6/2004 | Rokosz et al. |
| 2004/0205643 A1 | 10/2004 | Harrington |
| 2004/0230572 A1 | 11/2004 | Omoigui |
| 2004/0249774 A1 | 12/2004 | Caid et al. |
| 2004/0254911 A1 | 12/2004 | Grasso et al. |
| 2004/0263639 A1 | 12/2004 | Sadovsky et al. |
| 2004/0267700 A1 | 12/2004 | Dumais et al. |
| 2005/0027704 A1 | 2/2005 | Hammond et al. |
| 2005/0060312 A1 | 3/2005 | Curtiss et al. |
| 2005/0071319 A1 | 3/2005 | Kelley et al. |
| 2005/0086188 A1 | 4/2005 | Hillis et al. |
| 2005/0086610 A1 | 4/2005 | Mackinlay et al. |
| 2005/0091184 A1 | 4/2005 | Seshadri et al. |
| 2005/0108630 A1 | 5/2005 | Wasson et al. |
| 2005/0114324 A1 | 5/2005 | Mayer |
| 2005/0125382 A1 | 6/2005 | Karnawat et al. |
| 2005/0165805 A1 | 7/2005 | Novaes |
| 2005/0209983 A1 | 9/2005 | MacPherson |
| 2005/0234953 A1 | 10/2005 | Zhang et al. |
| 2005/0251497 A1 | 11/2005 | Barth et al. |
| 2006/0026147 A1 | 2/2006 | Cone et al. |
| 2006/0036683 A1 | 2/2006 | Bracewell et al. |
| 2006/0136409 A1 | 6/2006 | Leidig |
| 2006/0161553 A1 | 7/2006 | Woo |
| 2006/0167825 A1* | 7/2006 | Sayal .............. G06N 5/022 706/45 |
| 2006/0200432 A1 | 9/2006 | Flinn et al. |
| 2006/0218115 A1 | 9/2006 | Goodman et al. |
| 2006/0259344 A1 | 11/2006 | Patel et al. |
| 2007/0033105 A1 | 2/2007 | Collins et al. |
| 2007/0038600 A1 | 2/2007 | Guha |
| 2007/0043609 A1 | 2/2007 | Imam et al. |
| 2007/0050253 A1 | 3/2007 | Biggs et al. |
| 2007/0055657 A1 | 3/2007 | Yano |
| 2007/0106633 A1 | 5/2007 | Reiner |
| 2007/0124297 A1 | 5/2007 | Toebes |
| 2007/0150646 A1 | 6/2007 | Yoon et al. |
| 2007/0174041 A1 | 7/2007 | Yeske |
| 2007/0198505 A1 | 8/2007 | Fuller |
| 2007/0250465 A1 | 10/2007 | Moden |
| 2007/0255735 A1 | 11/2007 | Taylor et al. |
| 2008/0086558 A1 | 4/2008 | Bahadori et al. |
| 2008/0097987 A1 | 4/2008 | Shih et al. |
| 2008/0104004 A1 | 5/2008 | Brave et al. |
| 2008/0120287 A1 | 5/2008 | Guan et al. |
| 2008/0195664 A1 | 8/2008 | Maharajh et al. |
| 2008/0228537 A1 | 9/2008 | Monfried et al. |
| 2008/0244431 A1 | 10/2008 | Chea et al. |
| 2008/0294617 A1* | 11/2008 | Chakrabarti ...... G06F 17/30867 |
| 2008/0301541 A1 | 12/2008 | Karidi |
| 2009/0070326 A1 | 3/2009 | Kraft |
| 2009/0164516 A1 | 6/2009 | Svendsen |
| 2009/0276368 A1 | 11/2009 | Martin et al. |
| 2010/0114689 A1 | 5/2010 | Kennedy et al. |
| 2011/0196733 A1 | 8/2011 | Li et al. |
| 2011/0320307 A1* | 12/2011 | Mehta .............. G06Q 30/0282 705/26.7 |
| 2012/0021774 A1 | 1/2012 | Mehta et al. |
| 2012/0290517 A1 | 11/2012 | Frank |
| 2013/0346234 A1 | 12/2013 | Hendrick et al. |
| 2014/0046754 A1 | 2/2014 | Lee et al. |
| 2014/0052567 A1 | 2/2014 | Bhardwaj |
| 2014/0075385 A1* | 3/2014 | Wan ................ G06Q 10/1093 715/812 |
| 2015/0199010 A1* | 7/2015 | Coleman .............. A61B 5/0006 345/156 |
| 2015/0356658 A1 | 12/2015 | Morris |

FOREIGN PATENT DOCUMENTS

| | | |
|---|---|---|
| WO | WO 02/08950 | 1/2002 |
| WO | WO 2004/075466 | 9/2004 |
| WO | WO 2005/029368 | 3/2005 |
| WO | WO 2005/052727 | 6/2005 |
| WO | WO 2006/071931 | 7/2006 |
| WO | WO 2009/021198 | 2/2009 |

OTHER PUBLICATIONS

Alton—Scheidl et al. "Select: Social and Collaborative Filtering of Web Documents and News," Proceedings of the ERCIM Workshop (56) References Cited

OTHER PUBLICATIONS on User Interfaces for All: User-Tailored Information Environments. Nov. 28, 1999.
Arpaci-Dusseau, A.C. Implicit Coscheduling Coordinated Scheduing with Implicity Information in Distributed Systems. ACM Transactions on Computer Systems, 19, 3, 283. Aug. 2001.
Asakawa, K., at al. Neural Networks in Japan. (Artificial Intelligence)(Cover Story)(Technical). Communications of the ACM, v37. n3. p. 106(7). Mar. 1994.
Boyan, J. et al.; A Machine Learning Architecture for Optimizing Web Search Engines; AAAI Workshop on Internet-Based Information Systems, Portland, Oregon, 1996.
Brown et al., "Context-aware Retrieval: Exploring a New Environment for Information Retrieval and Information Filtering", Personal and Ubiquitous Computing Journal, vol. 5, Issue 4, Dec. 2001, 11 pages.
Chan, P.K. A Non-Invasive LEarning Approach to Building Web User Profiles. KDD-00 Workshop on Web Usage Analysis and User Profiling. 1999.
Chirita, P.A. et al.; Finding Related Pages Using the Link Structure of the WWW; L3S and University of Hannover, Germany.
De Meo, P., et al. An XML-Based Adaptive Multi-Agent System for Handling E-Commerce Activities. M. Jeckle and L.-J Zhang. ICWS-Europe 2003. LNCS 2853. p. 152-166.
Dean, J. et al.; Finding Related Pages in the World-Wide Web; Computer Networks vol. 31, No. 11-16 p. 1467-79; Elsevier; May 17, 1999; Netherlands.
Drogan, M. et al.; Extracting Riches from the Web: Web Mining/ Personalization; SCI 2003. 7th World Multiconference on Systemics, Cybernetics and Informatics Proceedings vol. 16 p. 214-19; IIIS; Orlando, FL, USA; 2003.
Eichorn G., et al. The NASA Astrophysics Data System: The Search Engine and its User Interface Harvard-Smithsonian Center for Astrophsyics, Cambridge, MA.
Freeberg, Davis, "Will Lycos Settle Claims Against Tivo, Blockbuster & Netflix Out of Court?" Aug. 16, 2007, http://media.seekingalpha.com/article/44627.
Ferguson, I.A. et al.; Multiagent Learning and Adaptation in an Information Filtering Market; Interactive Information Group, Institute for Information Technology, National Research Council; Ottawa ON, Canada; 1996.
Graham, P., et al. A Mechanism for the Dynamic Construction of Clusters Using Active Networks. Proceedings International conference on Parallel Processing Workshops. IEEE Comput. Soc. Los Alamitos, CA. 2001.
Hammer, M. et al.; Acquisition and Utilization of Access Patterns in Relational Data Base Implementation; 1976 Joint Workshop on Pattern Recognition and Artificial Intelligence p. 14; IEEE, New York. NY, USA; 1976;.
Hsu et al.; "Learning Database Abstractions for Query Reformulation"; 1993; Department of Computer Science, University of Southern California, Los Angeles, CA.
Iamnitchi, A.I. Resource Discovery in Large Resource-Sharing Environments. The University of Chicago. 2003. vol. 6410B of Dissertations Abstracts International. p. 5035.
Ianni, G.; Intelligent Anticipated Exploration of Web Sites; INFSYS Research Report Sep. 1, 1843; Oct. 9, 2001; Austria.
Ianni, G.: An Agent System Reasoning About the Web and the User; Department of Mathematics, Universita della Calabria, Rende, Italy.
Jameson, A.; User-Adaptive and Other Smart Adaptive Systems: Possible Synergies; Proceedings of the First EUNITE Symposium, Tenerife, Dec. 13-14, 2001.
Joachims, T. et al.; WebWatcher: A Tour Guide for the World Wide Web; School of Computer Science, Carnegie Mellon University, Pittsburg, PA; Sep. 1996;.
Osman, I.M. Matching Storage Organization to Usage Pattern in Relational Data Bases. Univ. Durham, U.K. 1974.
Paepcke, A. et al: "Beyond Document Similarity: Understanding Value-Based Search and Browsing Technologies" SIGMOD Record, ACM, New York, NY, US, vol. 29, No. 1, Mar. 1, 2000 pp. 80-92.
Pohle, C. et al.; Building and Exploiting Ad-Hoc Concept Hierarchies for Web Log Analysis; Data Warehousing and Knowledge Discovery. 4th International Conference, DaWaK 2002. Proceedings (Lecture Notes in Computer Science vol. 2454) p. 83-93; Springer-Verlag, Berlin, Germany; 2002;.
Ruthven, I. Incorporating Aspects of Information Use into Relevance Feedback. Journal of Information Retrieval. 2, 1-5. Kluwer Academic Publishers, Boston. 1992.
Ruthven et al.; "Selective Relevance Feedback Using Term Characteristics"; 1999; Department of Computing Science, University of Glasgow, Scotland.
Suh et al., "Context-based User Profile Management for Personalized Services", ubiPCMM 2005, pp. 64-73.
Thawani et al., "Context Aware Personalized Ad Insertion in an Interactive TV Environment", 2004, 7 pages.
Vogt, C.C. et al.; Using Relevance to Train a Linear Mixture of Experts; Computer Science and Engineering 0114, University of California, San Diego; 1997.
Weideman, M. et al.; The Effect of Search Engine Keyword Choice and Demographic Features on Internet Searching Success; Information Technology and Libraries, 23, 2, 58(8); Jun. 2004.
Zhao, D.G. Usage Statistics Collection and Management in the ELINOR Electronic Library. Journal of Information Science. vol. 21. No. 1 p. 1-9. 1995 U.K.
International Search Report re International Publication No. WO 2006/071931, dated May 24, 2007.
International Search Report re International Publication No. WO 2009/021198, dated Nov. 6, 2008.

\* cited by examiner

SYSTEM AND METHOD FOR CONTEXT-AWARE RECOMMENDATION THROUGH USER ACTIVITY CHANGE DETECTION

TECHNICAL FIELD

The present disclosure relates to web personalization and recommendation systems and, in particular, to context-aware recommendation systems.

BACKGROUND

Recommendation systems have been broadly used in various e-commerce applications such as targeted marketing, advertisement, personalized search, etc. Despite the widespread application of recommendation systems, capturing and adapting to users' change of interest are still an open problem for many domains and applications. Ignoring these changes may result in recommending items that are not interesting to the user anymore while they would match the user's previous interests. To solve this problem, one solution would be to limit a size of the profile to a maximum threshold or limit a user's profile to contain only preferences gathered in a recent fixed sized window of time. However, it is difficult if not impossible to find a fixed global threshold that would be optimal for all the users. Therefore, limiting the profile size would result in losing information about a user's preferences and making the recommendation systems less useful.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Embodiments of the present disclosure relate to contextual modeling using an interactional view without limiting contextual variables that affect the usefulness of recommendations. In an interactional view, contextuality may be a rational property that holds between objects (e.g., a user) and activities (e.g., clicking on a product web page), and context may arise from activities, which may be induced by the context. Therefore, while context may not be observable in the interactional view, the activities induced by the context may be observed and used to indicate the context. Embodiments of the present disclosure monitor user activities (e.g., clicking on a link of a webpage, lingering on a web page, etc.), extract user preference data from the user activities, detect user activity changes, and generate recommendations based on the user preference data such that the recommendations match the most recent preferences of the user.

Figure 1:
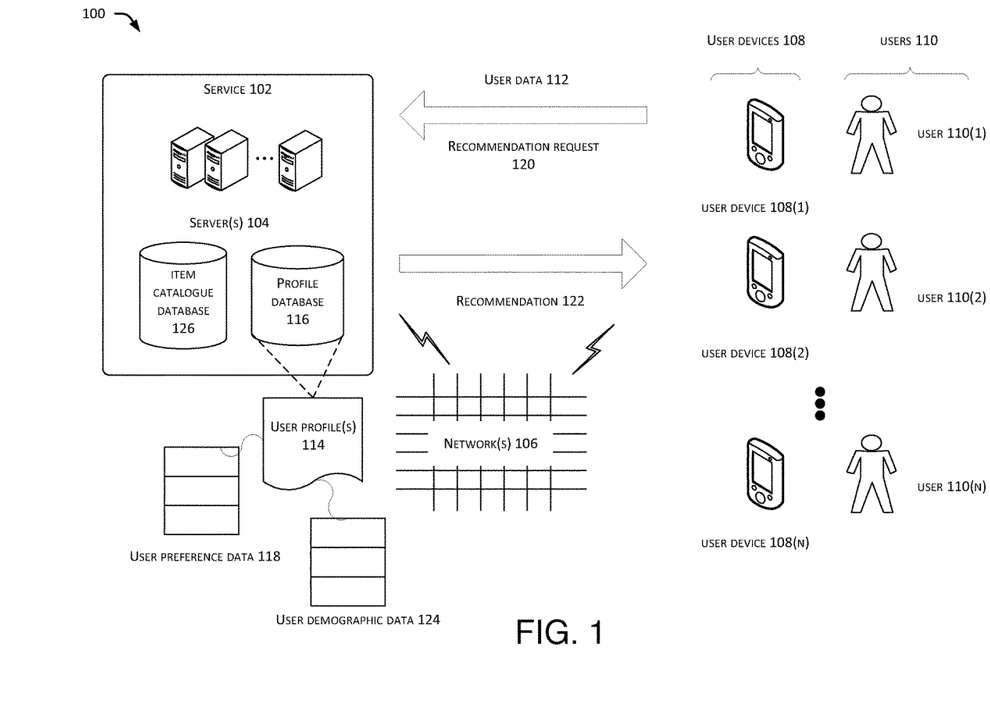
FIG. 1 is a block diagram depicting a computing environment within which an example embodiment of the present disclosure may be implemented.

FIG. 1 is a block diagram depicting a computing environment 100 within which an example embodiment of the present disclosure may be implemented. Computing environment 100 includes a service 102, which may generate recommendations associated with one or more items. Service 102 may include a set of related software functionalities that may be used and reused for different purposes, together with the policies that, for example, predict a 'rating' or 'preference' that a user would give to an item. The service 102 may include or be associated with one or more server(s) 104. For simplicity, the terms "server 104" is used to refer to the one or more servers 104.

Server 104 may be connected to one or more network(s) 106 to exchange information with multiple user devices 108 (e.g., a user device 108(1), a user device 108(2) and so on, up to a user device 108(n)) associated with multiple users 110 (e.g., a user 110(1), a user 110(2) and so on, up to a user 110(n)), where n is a positive integer greater than 1. Network(s) 106 may include wired and/or wireless networks that enable communications between the various computing devices described in computing environment 100. In some embodiments, network(s) 106 may include local area networks (LANs), wide area networks (WAN), mobile telephone networks (MTNs), and other types of networks, possibly used in conjunction with one another, to facilitate communication between the various computing devices (e.g., server 104, user devices 108, etc.). User devices 108 may be a mobile or desktop computer, a personal data assistant (PDA), an internet appliance, an internet enabled mobile phone, a server or any other computing device configured with a network connection.

In some embodiments, server 104 may collect and/or retrieve user data 112 associated with users 110 from, for example, user devices 108, and store the user information as user profile(s) 114 in a profile database 116. For simplicity, the terms "user profile 114" is used to refer to the one or more user profiles 114. For example, a given user profile 114 may include a collection of records of user information (e.g., user demographic information 124) and behavior (e.g., user actions) that is, for example, associated with one or more items.

User demographic information 124 may include user information related to, for example, gender, age, ethnicity, knowledge of languages, disabilities, mobility, home ownership, employment status, location, etc. The user actions may include, for example, user interaction with service 102, and an individual user action of a user may be monitored to generate a user activity event. In some embodiments, user profile 114 may be obtained from, for example, store receipts, credit card purchases, mail-order requests, information inquiries, browsers, cookies, and other sources related to customer preferences or predisposition associated with the one or more items.

In some embodiments, user profile 114 may include user preference data 118, which may be maintained by profile database 116. For example, profile database 116 may include a history of user preferences of one or more users interacting with service 102 within a predetermined time period or in a real-time manner. In some embodiments, service 102 may also include an item catalogue database 126 that stores and maintains an item catalogue.

In some embodiments, user preference data 118 for a given user may include choices that the user has made with respect to the user's interests (e.g., highly likes, partially likes, dislikes, etc.). For example, user preference data 118 may include implicit and/or explicit information about a user, the extent to which the user likes or dislikes one or more items. The implicit and/or explicit information may be extracted from the user interaction with service 102. For example, explicit information may be in the form of ratings associated with the item, and implicit information may be generated by interpreting the user interaction data. For example, an online retailer website may infer that a user likes a given product if the user stays on the item page, where the product is presented, more than a predetermined time period. In some embodiments, profile database 116 may contain a collection of organized user preference data 118 for multiple users (e.g., users 110(1)-110(n)) or one or more categories of users. Although user 110(1) is used in various examples presented below, those skilled in the art would appreciate that the schemes and techniques described herein also apply to one or more of the other users among users 110(2)-110(n).

In some embodiments, server 104 may receive a recommendation request 120 from, for example, user device 108(1) associated with user 110(1). Server 104 may retrieve user profile 114 corresponding to user 110(1) based on recommendation request 120. In these instances, server 104 may compute a value (e.g., a utility score) of an item based on user profile 114 corresponding to user 110(1) and item models (e.g., feature-based models) built based on user preference data 118 of multiple users and item information of multiple items. In some embodiments, server 104 may detect a user activity change of user 110(1), and therefore modify the utility score in response to the user activity change.

Based on the utility score, server 104 may generate a recommendation 122, and transmit recommendation 122 to user device 108(1). The utility score refers to a value that is assigned to an item with respect to a certain user, and may be a basis for selecting a set of items to be presented to the user.

In some embodiments, the feature-based models may refer to a scientific model that is built for an item as a combination of one or more content-based features and one or more collaborative-based features. In some embodiments, the one or more content-based features may represent or be associated with an item as one or more item attributes including, for example, categorical information (e.g., categorical attributes), title, price, etc. The one or more content-based features may be extracted from an item catalogue database. In some embodiments, categorical attributes may be coded as binary features such that an individual category may represent a feature. In these instances, the value of that feature for the item may be assigned as 1 if the item belongs to a corresponding category. Also, numerical attributes may be transferred (e.g., discretized) into a set of bins and may be represented as binary features. To extract features based on a textual attribute (e.g., item description or title), k-Means clustering algorithm may be used to cluster items based on the attribute. Individual cluster may represent a binary feature.

In these embodiments, the one or more collaborative-based features may represent or be associated with an item as one or more features capturing users' preferences toward the item. The collaborative-based features may be extracted based on user preference data associated with multiple user profiles. In some embodiments, Principal Component Analysis (PCA) may be applied to represent the item in a lower-dimensional space with N dimensions, where N is the size of the reduced dimensional space. In these instances, the neighborhood of items may be preserved, and the items that are opinioned (e.g., rated, purchased, visited, etc.) similarly by the users may be expected to be close in the reduced dimensional space.

Figure 2:
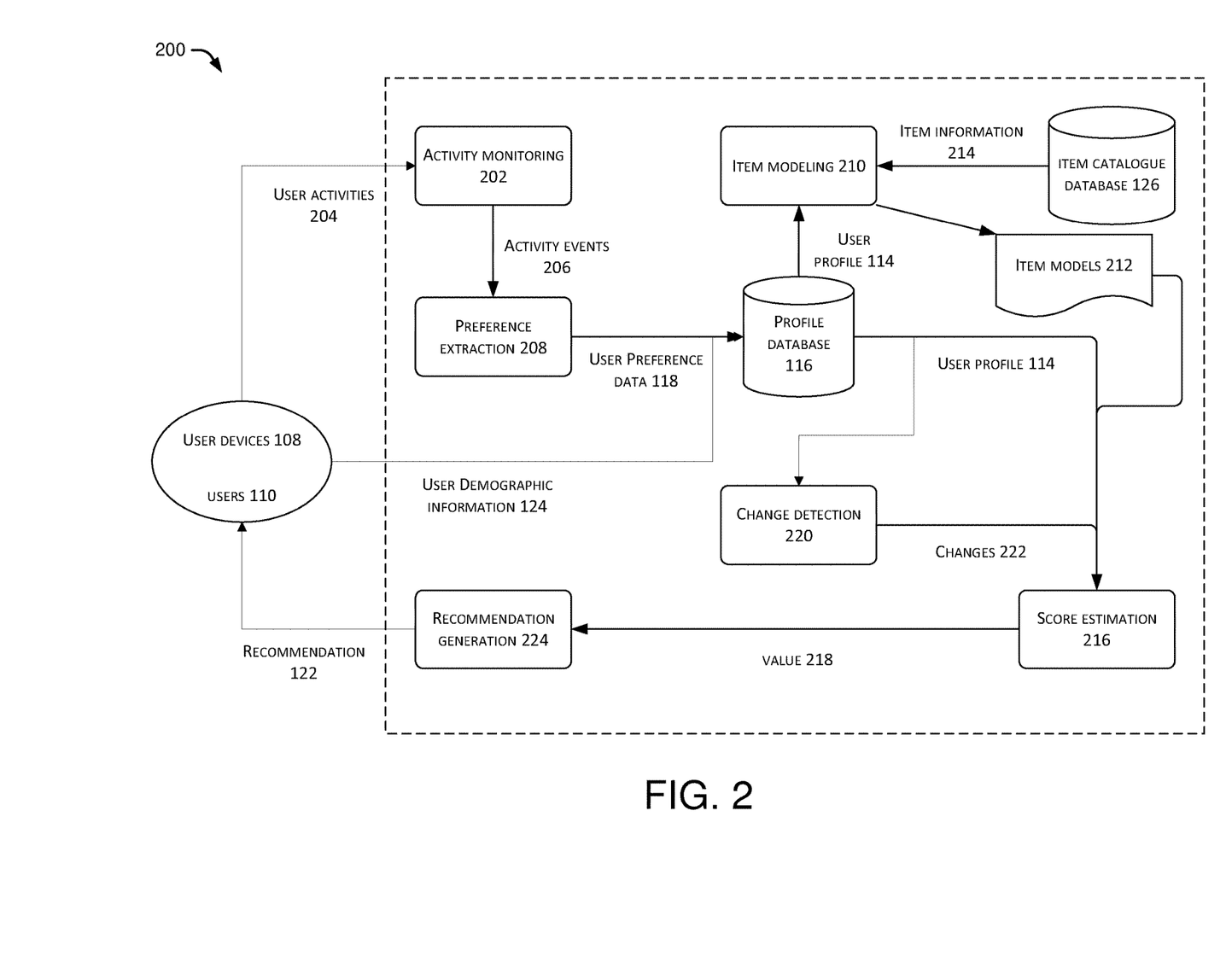
FIG. 2 is a block diagram depicting a computing scheme within which an example embodiment of the present disclosure may be implemented.

FIG. 2 is a block diagram depicting a computing scheme 200 within which an example embodiment of the present disclosure may be implemented. One or more portions (e.g., one or more blocks within the dash box) of computing scheme 200 may be implemented by server 104. Computing scheme 200 may include activity monitoring 202. During activity monitoring 202, server 104 may track user activities 204 (e.g., clicking, lingering on a web page of an item) of multiple users (e.g., users 101(1)-101(n)) and generate activity events 206 based on user activities 204. For example, server 104 may determine information of user interactions with service 102 from user activities 204, and generate activity events 206 based on the information of user interactions with service 102.

Computing scheme 200 may also include preference extraction 208 in which server 104 may process activity events and extract user preference data 118 including, for example, implicit or explicit user preferences of the multiple users. For an individual user of the multiple users (e.g., users 101(1)-101(n)) that interacts with service 102, user profile 114 may be generated to contain extracted user preference data 118 for the individual user. In some embodiments, user profile 114 of the individual user may also include demographic information of the individual user. User profile 114 of the multiple users may be stored in profile database 116.

Computing scheme 200 may also include item modeling 210 in which server 104 may build item models 212 based on user profile 114 of multiple users and item information 214 of multiple items. For example, item information 214 may be retrieved from an item catalogue stored in an item catalogue database 126. Item information 214 may include various types of information for each individual item of a set of items, such as title, price, color, etc. of the multiple items. In these instances, server 104 may use two sources (e.g., user profile 114 and item information 214) to produce item models 210 (e.g., feature-based item models).

Computing scheme 200 may also include score estimation 216. Server 104 may retrieve user profile 114 of a certain user (e.g., user 110(1)) from profile database 116 and use the feature-based product models to estimate value 218 (e.g., utility scores) of multiple items. For simplicity, the term "value 218" is used to refer to the one or more values 218.

Computing scheme 200 may also include change detection 220. Server 104 may perform change detection 220 to detect one or more changes 222 (e.g., contextual changes) of user 110(1). For example, contextual changes may be represented and/or indicated by activity changes of user 110(1). In some embodiments, server 104 may monitor changes in user preference data 118 of user 110(1) and determine whether one or more changes constitute a significant change in the user behavior of user 110(1). For example, the server 104 may analyze the user preference data and may determine that the one or more changes are significant change if a prediction confidence value corresponding to the one or more changes is greater than a predetermined threshold. In response to a determination that such significant change is present, server 104 may modify value 218 based on changes 222.

Computing scheme 200 may also include recommendation generation 224 in which server 104 may generate recommendation 122 based on the utility scores of one or more items for presentation to a given user as recommended items for purchase. For example, recommendation 122 may include one or more items that are selected based on utility scores of the one or more items, e.g., the one or more items having the highest utility scores among a larger set of items. Server 104 may also present the top K items with the highest utility scores to users 110 via user devices 108, where K is a positive integer greater than 1.

Figure 3:
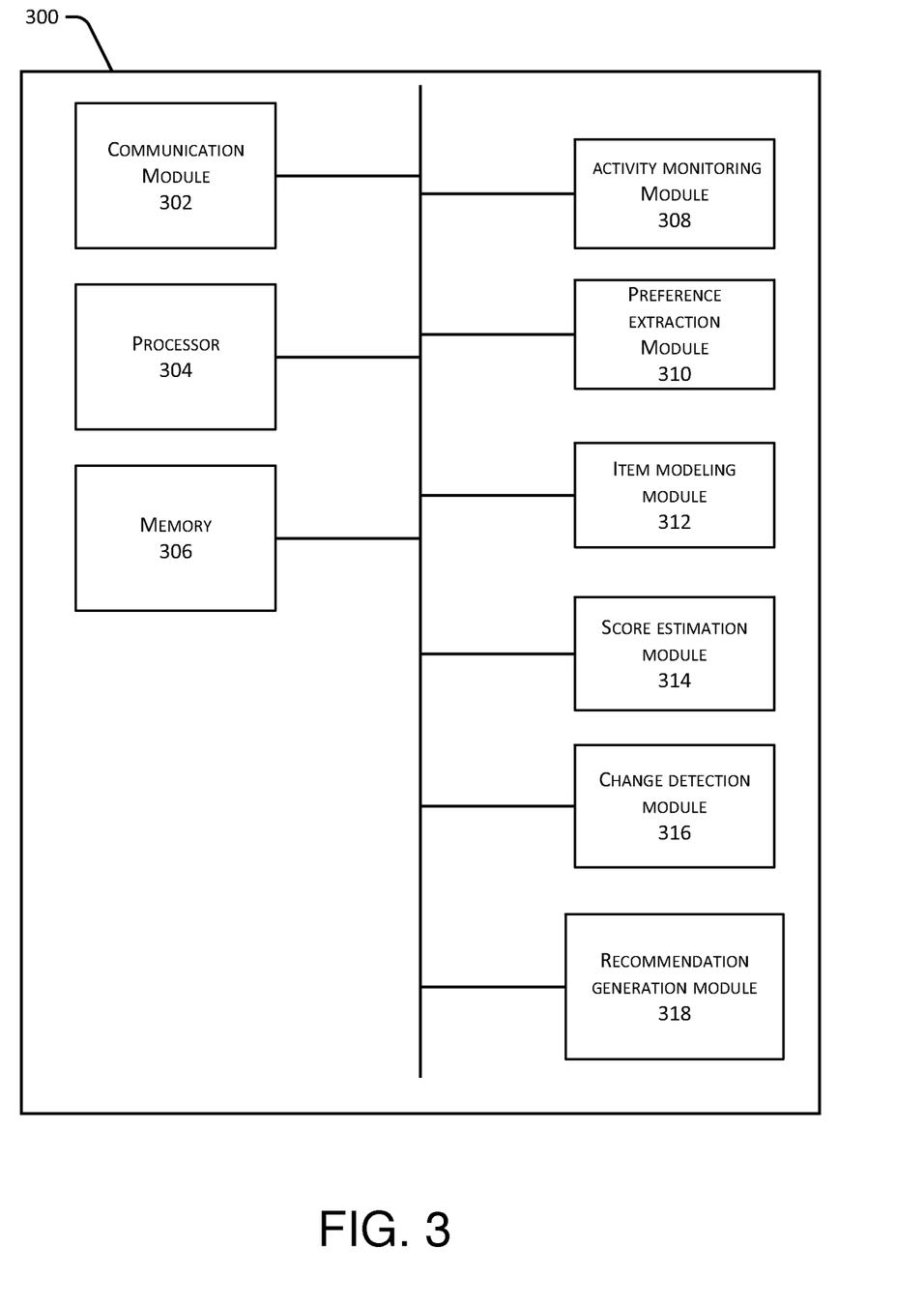
FIG. 3 is a block diagram depicting an embodiment of a computing device configured to implement systems and methods of the present disclosure.

FIG. 3 is a block diagram depicting an embodiment of a computing device 300 configured to implement systems and methods of the present disclosure. Computing device 300 (e.g., server 104) performs various functions related to recommendation generation, as discussed herein. In some embodiments, computing devices 300 may include ones of computing devices that cooperatively implement the functions described herein. Computing device 300 may include a communication module 302, a processor 304, and a memory 306. Communication module 302 allows computing device 300 to communicate with other systems, such as communication networks, other servers, etc. Processor 304 executes one or more sets of instructions to implement the functionality provided by computing device 300. Memory 306 stores these instructions as well as other data used by processor 304 and other modules contained in computing device 300.

Computing device 300 may also include an activity monitoring module 308 configured to monitor user activities (e.g., user activities 204) of users 110. For example, monitoring module 308 may monitor users' interactions with service 102 and generate an activity event for an individual interaction of each of the users' interactions. There may be various types of activity events including, for example, clicking, lingering, purchasing, rating events, etc. corresponding to various types of users' interactions.

Computing device 300 may also include a preference extraction module 310 configured to extract user preference data 118 from activity events 206. For example, user preference data 118 may include users' implicit or explicit preferences on one or more items. Various methods may be implemented to extract user preference data 118. For example, if a user lingers on an item page more than a predetermined time period, it may be assumed that the user likes the item. If the user lingers less than the predetermined time period, it may be inferred that the user is not interested in the item.

Computing device 300 may also include an item modeling module 312 configured to build item models (e.g., feature-based item models) based on item information 214 of multiple items and user profile 114 of multiple users. For example, server 104 may model an individual item of the multiple item as a combination of content-based and collaborative-based features. In some embodiments, the content-based features may be extracted from item catalogue database 126, which contains different types of item attributes including categorical information, title, price, etc. The categorical attributes may be coded as binary features such that an individual category may represent a feature. In these instances, the value of each of the feature for an item is 1 if the item belongs to the corresponding category, and 0 if it does not belong to the corresponding category. Similarly, numerical attributes may be discretized into a set of bins and may be represented as binary features. To extract features based on a textual attribute (e.g., item description or title), k-Means clustering algorithm may be used to cluster items based on the attribute. Individual cluster may represent a binary feature.

The collaborative-based features may be extracted based on user preference data 118. For example, PCA may be applied to represent an individual item in a lower-dimensional space with N dimensions, wherein N is the size of the reduced dimensional space. This application may preserve a neighborhood of items meaning that items rated/purchased/visited similarly by the users are expected to be close in the reduced dimensional space.

Computing device 300 may also include a score estimation module 314 configured to compute value 218 (e.g., utility score) of an individual item of multiple items based on item models 212, user profile 114 of a certain user (e.g., user 110(1)), and/or changes 222. For example, score estimation module 314 may compute a utility score for an individual item of each of multiple candidate items that service 102 determines for recommendation 122.

The utility score may be a basis for selecting a set of items to be presented to the user in recommendation 122. In some embodiments, score estimation module 314 may learn the preferences of user 110(1) in one or more interactions incrementally as user 110(1) interacts with service 102. Score estimation module 314 may optimize an average utility of recommendations over one or more interaction sessions of user 110(1). Based on types of preferences of user 110(1), there may be different interpretations of the average utility. For example, if a preference is explicit (e.g., ratings), the average utility may be the average ratings of the recommendations. If the preference is implicit (e.g., preferences inferred from the interaction data of user 110(1)), the average utility may be computed using, for example, average Click Through Rate (CTR).

At an individual step of an interaction with the user, service 102 may select a list of items as recommendations and receive a reward from service 102 as the average utility of the recommendations. Service 102 may maximize the total rewards for the presented recommendations with respect to a session of user 110(1) on a particular website. In some embodiments, service 102 may balance between exploration and exploitation. In these instances, exploration refers to a phase where the online recommendation algorithm recommends an item that may not have the highest expected utility but observing the reward value from recommending that item may significantly reduce the uncertainty about the preferences of user 110(1) and therefore help to gain more utility in future interactions.

On the other hand, exploitation refers to the phase where service 102 may choose the recommendation list to maximize the immediate utility. The trade-off between exploration and exploitation can be modeled as a multi-armed bandit (MAB) problem. Several techniques, such as $\epsilon$-greedy algorithm, may solve the MAB problem. Following $\epsilon$-greedy approach, at each round t, the algorithm recommends the item with the highest expected reward with probability 1-$\epsilon$ and recommends a random item with probability $\epsilon$. Upper Confidence Bounds (UCB) algorithms may also be used to solve the MAB problem, and guarantee an upper bound on the total regret (e.g., difference of the total utility from that of an optimal strategy). In some embodiments, randomized probability matching algorithms (e.g., Thompson Sampling) may be used to trade-off between exploration and exploitation. Using Thompson Sampling algorithm, for example, service 102 may choose an item for recommendation in proportion to the probability of being optimal. The general description of Thompson Sampling algorithm is provided in Algorithm 1 below.

Algorithm 1

```
D=∅
for t = 1 to T do
    Draw θ_u^t ∝ P(θ_u|D)
    Select a_t = argmaxE_r(r|F_a, θ_u^t)
    Observe reward r_t
    D=D ∪(F_at, r_t)
end for
```

In the description of Algorithm 1, $\theta_u$ denotes the unknown parameter modeling the preferences of the user. At each round of interaction, an item is recommended to the user and the reward for the recommended item is observed. The algorithm will learn $\theta_u$ as the user interacts with the system. At the first round of interaction, the set of observations, shown as D, is empty and $p(\theta_u|D)$ is initialized to a standard Gaussian prior. Each observation has the form of (F, r) where F indicates the features of the recommended item and r represents the reward for the recommended item. As more rewards are gathered at each step, Bayesian updating is performed to update $\theta_u$ distribution based on the observed rewards. At each step t, $\theta_u^t$ is drawn as a sample from $p(\theta_u|D)$. The expected reward for each item a if it is presented as a recommendation to user u, is shown as $E_r(r|F_a,\theta_u^t)$. The item with maximum expected reward, shown as $a_t$, is then selected for recommendation. The reward for that recommendation, shown as $r^t$, is then observed. The features corresponding to the selected item and the observed reward are then added to the set of observations.

One main problem that needs to be addressed in order to run the sampling process is to compute the posterior distribution $p(\theta_u|D)$. The goal is to estimate this distribution as more and more observations are revealed at each round. Here the problem is addressed for the special case of linearly parameterized bandits. The bandit problems with linear payoffs has been widely studied. Studies analyzing the regret bounds for Thompson Sampling algorithm show that this approach may achieve theoretical bounds that are close to the best bounds. It has also been experimentally shown to be close to optimal.

Assuming a linear Gaussian system, prior and likelihood follow normal distributions may be represented using Equations 1 and 2.

$$p(\theta_u) \sim N(\mu_{\theta_u}, \Sigma_{\theta_u}) \quad (1)$$

$$p(R|\theta_u) \sim N(F\theta_u, \Sigma_r) \quad (2)$$

In this formulation, F represents the features for the observations and R indicates the rewards for the observations. For example, given two observations ($F_{a1}$, $r_1$) and ($F_{a2}$, $r_2$), R contains two elements $r_1$ and $r_2$ and F=[$F_{a1}$, $F_{a2}$] where $F_{ai}$ contains the extracted features for item $a_i$. Also, ($\eta$ $\theta_u$) represents the mean of the normal prior distribution and $\Sigma_{\theta_u}$ indicates the covariance matrix of the prior. The likelihood distribution shows the likelihood of the rewards for the user u. The mean of this distribution is computed as $F\theta_u$ and the standard deviation is shown as $\Sigma_r$. It can be shown that, given a linear Gaussian system, the posterior $p(\theta_u|D)$ is given using Equation 3.

$$p(\theta|r) = N(\mu_{\theta|r}, \Sigma_{\theta|r}) \quad (3)$$

$$\Sigma_{\theta|r}^{-1} = \Sigma_\theta^{-1} + F^T \Sigma_r^{-1} F \quad (4)$$

$$\mu_{\theta|r} = \Sigma_{\theta|r}[F^T \Sigma_r^{-1} R + \Sigma_\theta^{-1} \mu_\theta] \quad (5)$$

The posterior distribution follows a normal multivariate distribution with parameters $\mu_{\theta_u|D}$, and $\Sigma_{\theta_u|D}$ where the mean vector is computed using Equation 5 and the covariance matrix is computed using Equation 4. After computing the posterior distribution, $\theta_u$ is sampled and a utility score of each item a is computed as $r_a = F_a \theta_u$.

Computing device 300 may also include a change detection module 316 configured to detect user activity changes and enable modifying value 218 in response to the detected user activity changes. For example, if a change is detected in the behavior of user 110(1) by the change detection module 316, score estimation module 314 may adapt value 218 to prioritize the most recent preferences of user 110(1). In some embodiments, observations before the change point may be ignored.

In some embodiments, at each step t of interaction with a given user u, the change detection module may compare the user's interactions in the interval $I_t=(t-L, t]$ with interactions in the interval $I_{(t-L)}=(t-2L, t-L]$ where L is a fixed prespecified parameter representing the length of the interval. To model these two windows of interactions, $W_{I_t}=p(\theta|I_t)$ and $W_{I_{(t-L)}}=p(\theta|I_{(t-L)})$ are each computed, as normal multivariate distributions with parameters µ and Σ, according to Equation 3, where D is substituted with the observations in the corresponding window. The distance between these two distributions is used as a measure of change between these two windows and is computed using the Mahalanobis distance measure (e.g., Equation 6).

$$W_{I_t} \sim N(\mu_t, \Sigma_t) \quad (6)$$

$$W_{I_{(t-L)}} \sim N(\mu_{t-L}, \Sigma_{t-L})$$

$$\Sigma = \frac{\Sigma_t + \Sigma_{t-L}}{2}$$

$$\text{distance} = (\mu_t - \mu_{t-L})^T \Sigma^{-1} (\mu_t - \mu_{t-L})$$

These distance measures are tracked at each step t. A suitable change detection method may be applied to detect sudden changes in the distance measure with a certain confidence. For example, cumulative sum control chart (CUSUM) analysis may be applied to predict these changes. Score estimation module 314 may be then notified of these changes.

Computing device 300 may also include a recommendation generation module 318 configured to generate recommendation 122 and present to user 110(1). For example, recommendation generation module 318 may receive value 218 from score estimation module 314 and rank multiple items based on value 218. Recommendation generation module 318 may then selects the top K items with the highest scores and presents them to the user, wherein K is the size of the recommendations that user 110(1) receives at an individual round.

Figure 4:
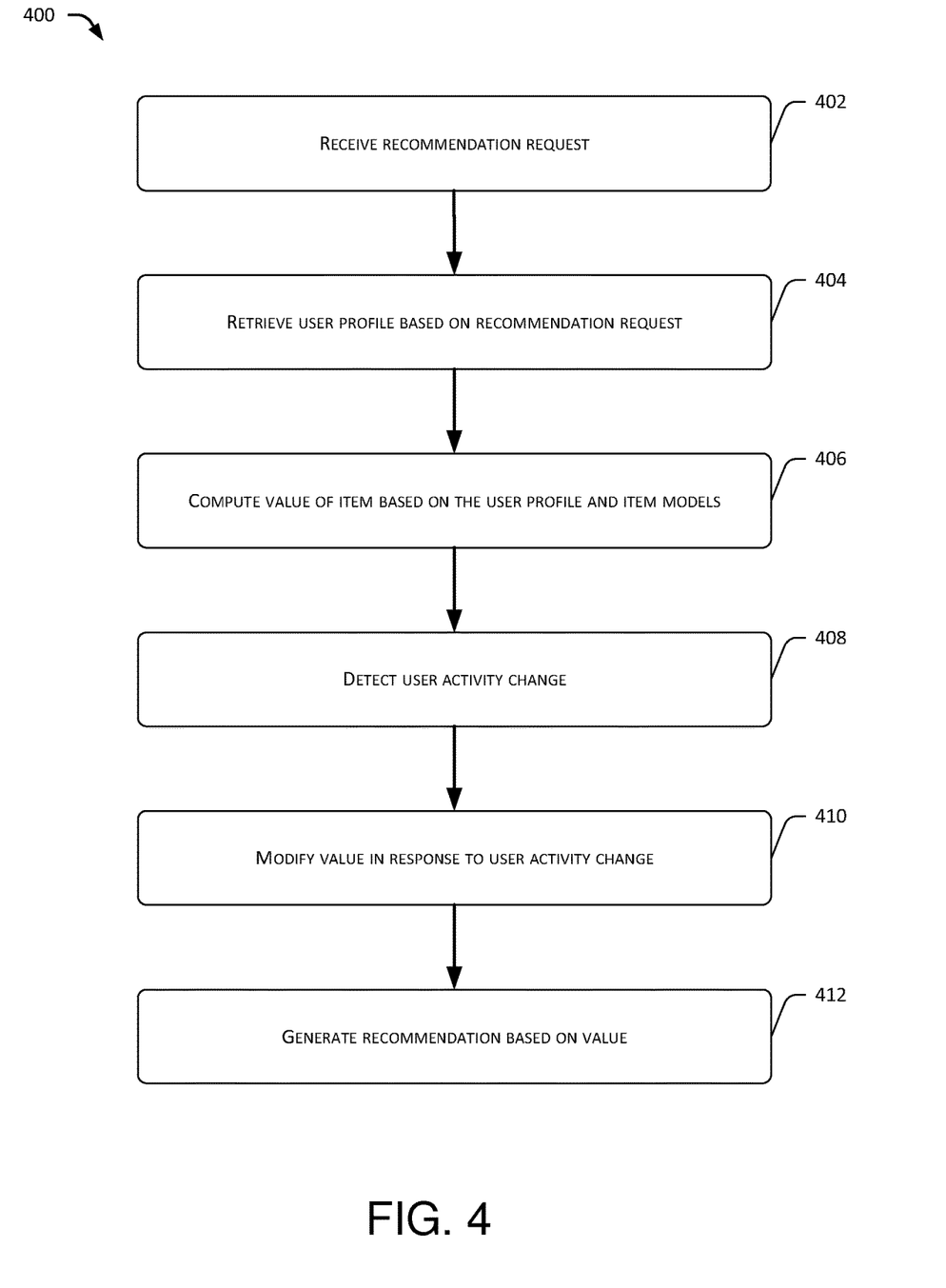
FIG. 4 is a flowchart diagram of an embodiment of a process for generating a recommendation.

FIG. 4 is a flowchart diagram of an embodiment of a process 400 for generating a recommendation. Example process 400 includes one or more operations, actions, or functions. Although illustrated as discrete blocks, various blocks may be divided into additional blocks, combined into fewer blocks, or eliminated, depending on the desired implementation. Process 400 may be implemented by one or more processors including, for example, the computing device 300, server 104, etc. For illustrative purposes, the operations described below are performed by one or more processors of server 104 as shown in FIG. 1 and/or the processor 304 of the computing device 300 as shown in FIG. 3.

At 402, one or more processors of server 104 may receive a recommendation request corresponding to a user. For example, server 104 may receive recommendation request 120 from user device 108(1) associated with user 110(1).

At 404, one or more processors of server 104 may retrieve a user profile (e.g., user profile 114) of the user based on the recommendation request. In some embodiments, user profile 114 may include user preference data (e.g., user preference data 118) of the user associated with one or more items and user demographic information of the user.

At 406, one or more processors of server 104 may compute a value (e.g., value 218) of an item based on user profile 114 and item models (e.g., item models 212) built based on user preference data of multiple users and item information of multiple items. To build item models 212, server 104 may track user activities of multiple users, and generate activity events based on the user activates. Server 104 may also extract user preference data 118 of the multiple users associated with the multiple items based on the activity events, and generate item models 212 based on user preference data 118 and item information 214 of the multiple items.

In some embodiments, server 104 may generate item models 212 using a combination of content-based features associated with the multiple items and collaborative-based features associated with user preference data 118. In these instances, server 104 may generate the content-based features based on the item information of the multiple items. For example, the item information may include at least one of categorical information, a title, a price, a color, and an item description that are associated with an individual item of the multiple items.

In some embodiments, server 104 may extract the collaborative-based features from user preference data 118 and item information 214 of the multiple items. In some embodiments, server 104 may generate the collaborative-based features by applying a dimensionality reduction method on user preference data 118. For example, the dimensionality reduction method comprises a principal component analysis (PCA) analysis.

At 408, one or more processors of server 104 may detect a user activity change (e.g., changes 222) of user 110(1). For example, server 104 may detect a user activity change of the user comprises detecting the user activity change using CUSUM analysis.

At 410, one or more processors of server 104 may modify the value in response to the user activity change. In these instances, server 104 may compute an additional value of the item based on an additional user profile and item models 214, and modify the value based on the additional value. In some embodiments, the additional user profile excludes user preference data that is collected before the user activity change is detected.

At 412, one or more processors of server 104 may generate a recommendation associated with the item based on value 218. For example, server 104 may generate recommendation 122 and transmit to user device 108(1) associated with user 110(1).

Figure 5:
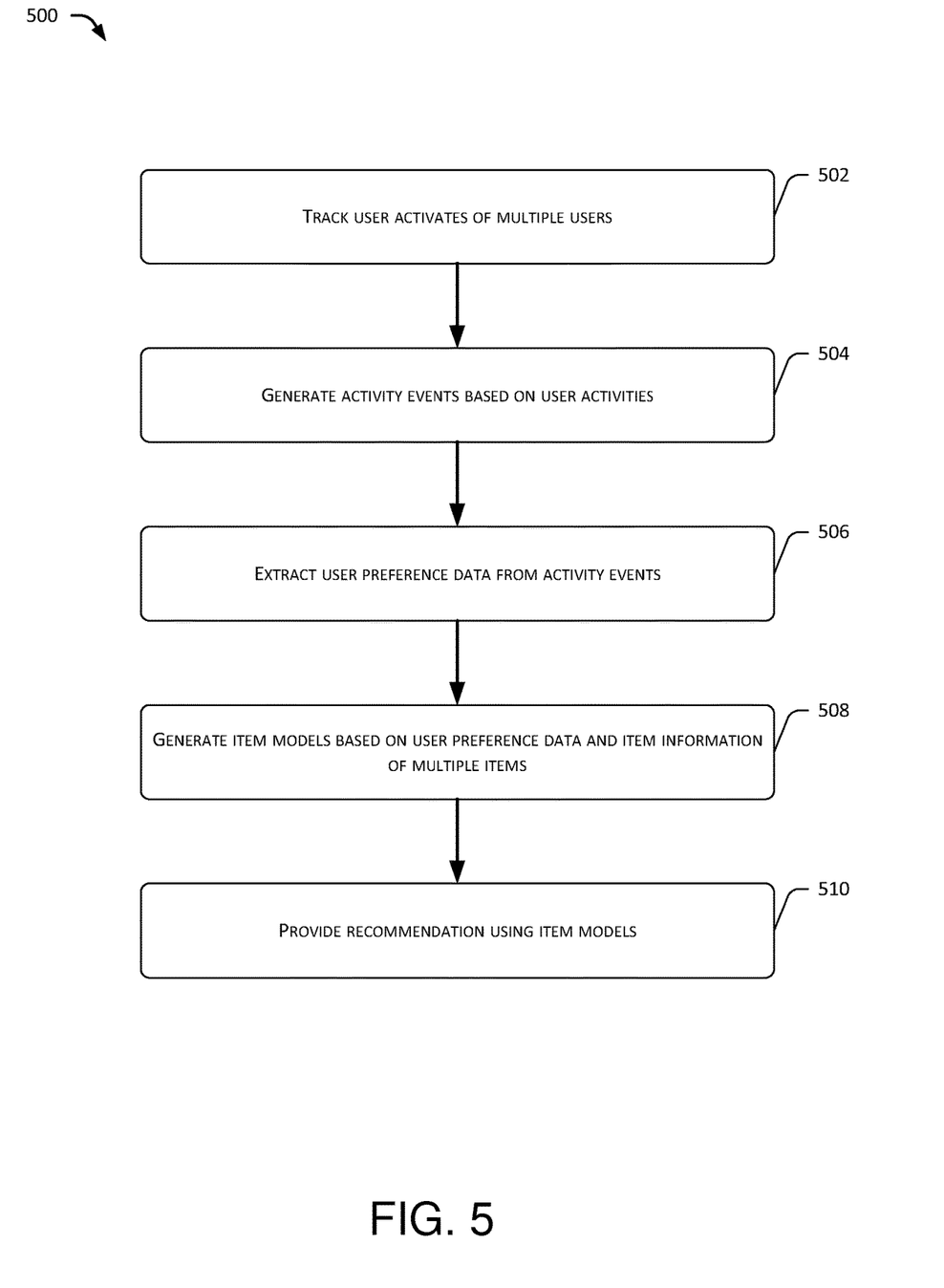
FIG. 5 is a flowchart diagram of an embodiment of a process for generating item models.

FIG. 5 is a flowchart diagram of an embodiment of a process 500 for generating item models. Example process 500 includes one or more operations, actions, or functions. Although illustrated as discrete blocks, various blocks may be divided into additional blocks, combined into fewer blocks, or eliminated, depending on the desired implementation. Process 500 may be implemented by one or more processors including, for example, the computing device 300, server 104, etc. For illustrative purposes, the operations described below are performed by one or more processors of server 104 as shown in FIG. 1 and/or the processor 304 of the computing device 300 as shown in FIG. 3.

At 502, one or more processors of server 104 may track user activities of multiple users. For example, server 104 may monitor and/or collect user activities 204 of users 110.

At 504, one or more processors of server 104 may generate activity events based on the user activates. For example, server 104 may generate activity events 206 based on user activities 204.

At 506, one or more processors of server 104 may extract, from the activity events, user preference data 118 of the multiple users associated with multiple item.

At 508, one or more processors of server 104 may generate item models 214 based on user preference data 118 and item information 214 of the multiple items. For example, user preference data 118 may include choices that an individual user (e.g., user 110(1) has made with respect to the user's interests (e.g., highly likes, partially likes, dislikes, etc.). For example, user preference data 118 may include implicit and/or explicit information about user 110 (1), the extent to which user 110(1) likes or dislikes one or more items.

In some embodiments, server 104 may generate item models 214 using a combination of content-based features associated with the multiple items and collaborative-based features associated with user preference data 118. In these instances, server 104 may generate the content-based features based on the item information of the multiple items, wherein item information 214 include at least one of categorical information, a title, a price, a color, and an item description that are associated with an individual item of the multiple items. Server 104 may also extract the collaborative-based features from user preference data 118 and the item information of the multiple items.

At 510, one or more processors of server 104 may provide a recommendation using the item models. For example, server 104 may receive recommendation request 120 corresponding to a user, and compute value 218 of an item based on user profile 114 associated with the user and the item models. In these instances, the user profile may include user preference data 118 of the user associated with one or more items and user demographic information of the user. Server 104 may also detect a user activity change of the user, modify the value in response to the user activity change, and generate the recommendation associated with the item based on the value.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
    tracking user interaction with items on a website during a first time window of a session on the website;
    extracting first user preference data based on the user interaction with the items during the first time window;
    generating a first user profile of a user based on the first user preference data and user demographic information of the user;
    computing a first utility value of an tern based on the first user profile and item models, the item models built based on user preference data of a plurality of users and item information of a plurality of items;
    selecting a subset of terns with highest utility values as a recommendation list;
    generating recommendations for the user based on the recommendation list;
    generating a first user preference distribution based on the user interaction with the items during the first time window;
    tracking user interaction with the items on the website during a second time window of the session on the website;
    extracting second user preference data based on the user interaction with the items during the second time window;
    generating a second user preference distribution based on the user interaction with the items during the second time window;
    comparing the first user preference distribution with the second user preference distribution;
    detecting whether an activity change of the user has occurred based on a distance between the first user preference distribution and the second user preference distribution;
    in response to detecting the activity change of the user based on the distance meeting a threshold condition:
    generating a second user profile corresponding to the second time window based on the second user preference data and exclusion of the first user preference data,
    computing a second utility value of the item based on the second user profile and the item models and exclusion of the first user preference data, and
    updating the recommendations based on the second utility value and exclusion of the first user preference data; and
    in response to not detecting the activity change of the user based on the distance not meeting the threshold condition:
    updating the first user profile of the user based on the second user preference data,
    updating the first utility value of the item based on the updated first user profile, and updating the recommendations based on the updated first utility value.

2. The method of claim 1, further comprising:
tracking user activities of a plurality of users;
generating activity events based on the user activities;
extracting the user preference data of the plurality of users based on the activity events; and
generating the item models based on the user preference data of the plurality of users and the item information of the plurality of items.

3. The method of claim 1, wherein the generating the item models based on the user preference data of the plurality of users and the item information of the plurality of items comprises generating the item models using a combination of content-based features associated with the plurality of items and collaborative-based features associated with the user preference data of the plurality of users.

4. The method of claim 3, further comprising:
generating the content-based features based on the item information of the plurality of items, the item information comprising at least one of categorical information, a title, a price, a color, and an item description that are associated with an individual item of the plurality of items.

5. The method of claim 3, further comprising:
extracting the collaborative-based features from the user preference data of the plurality of users and the item information of the plurality of items.

6. The method of claim 3, further comprising:
generating the collaborative-based features by applying a dimensionality reduction method on the user preference data of the plurality of users.

7. The method of claim 6, wherein the dimensionality reduction method comprises a principal component analysis (PCA) analysis.

8. An apparatus comprising:
a memory configured to store data and one or more sets of instructions; and
one or more processors coupled to the memory, the one or more processors configured to execute the one or more sets of instructions and perform operations comprising:
tracking user interaction with items on a website during a first time window of a session on the website;
extracting first user preference data based on the user interaction with the items during the first time window;
generating a first user profile of a user based on the first user preference data and user demographic information of the user;
computing a first value of an tern based on the first user profile and item models, the item models built based on user preference data of a plurality of users and item information of a plurality of items;
generating a recommendation associated with the item based on the first value;
generating a first user preference distribution based on the user interaction with the items during the first time window;
tracking user interaction with the items on the website during a second time window of the session on the website;
extracting second user preference data based on the user interaction with the items during the second time window;
generating a second user preference distribution based on the user interaction with the items during the second time window;
comparing the first user preference distribution with the second user preference distribution;
detecting whether a user activity change of the user has occurred based on a distance between the first user preference distribution and the second user preference distribution,
in response to detecting the user activity change of the user based on the distance satisfying a threshold condition:
generating a second user profile corresponding to the second time window based on the second user preference data and exclusion of the first user preference data,
computing a second value of the item based on the second user profile and the item models and exclusion of the first user preference data, and
updating the recommendation based on the second value and exclusion of the first user preference data, and
in response to not detecting the user activity change of the user based on the distance not meeting the threshold condition:
updating the first user profile of the user based on the second user preference data,
updating the first value of the item based on the updated first user profile, and
updating the recommendation based on the updated first value.

9. The apparatus of claim 8, wherein the detecting the user activity change of the user is further based on a change point analysis approach such as cumulative sum control chart (CUSUM) analysis.

* * * * *

UNITED STATES PATENT AND TRADEMARK OFFICE
CERTIFICATE OF CORRECTION

PATENT NO. : 9,836,765 B2
APPLICATION NO. : 14/281608
DATED : December 5, 2017
INVENTOR(S) : Negar Hariri Page 1 of 1

It is certified that error appears in the above-identified patent and that said Letters Patent is hereby corrected as shown below:

In Column 1 (page 3, item (56)) at Lines 5-6, Under Other Publications, change "Scheduing" to --Scheduling--.

In Column 1 (page 3, item (56)) at Line 18, Under Other Publications, change "LEarning" to --Learning--.

In Column 1 (page 3, item (56)) at Line 35, Under Other Publications, change "Astrophsyics," to --Astrophysics,--.

In Column 2 (page 3, item (56)) at Line 7, Under Other Publications, change "INFSYS" to --INFOSYS--.

In Column 9 at Lines 12-13, Change "($\eta\ \theta_u$)" to --($\mu\ \theta_u$)--.

In Column 12 at Line 24, In Claim 1, change "tern" to --item--.

In Column 12 at Line 28, In Claim 1, change "terns" to --items--.

In Column 14 at Line 1, In Claim 8, change "tern" to --item--.

Signed and Sealed this
Nineteenth Day of June, 2018

Andrei Iancu
*Director of the United States Patent and Trademark Office*